(12) United States Patent
Yamaoka et al.

(10) Patent No.: US 11,252,867 B2
(45) Date of Patent: *Feb. 22, 2022

(54) SAFETY ASSEMBLY FOR A LAWNCARE APPARATUS

(71) Applicant: Chervon (HK) Limited, Wanchai (HK)

(72) Inventors: Toshinari Yamaoka, Nanjing (CN); Fangjie Nie, Nanjing (CN); Haishen Xu, Nanjing (CN); Xiandian Shao, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,589

(22) Filed: Dec. 20, 2019

(65) Prior Publication Data
US 2020/0120867 A1 Apr. 23, 2020

Related U.S. Application Data

(63) Continuation of application No. 15/238,276, filed on Aug. 16, 2016, now Pat. No. 10,524,420, which is a (Continued)

(30) Foreign Application Priority Data

Oct. 15, 2012 (CN) .......................... 201210387914.9
May 3, 2013 (CN) ........................ 201220602040.X

(51) Int. Cl.
*A01D 34/82* (2006.01)
*A01D 34/68* (2006.01)
(Continued)

(52) U.S. Cl.
CPC ......... *A01D 34/828* (2013.01); *A01D 34/006* (2013.01); *A01D 34/68* (2013.01);
(Continued)

(58) Field of Classification Search
CPC .... A01D 34/824; A01D 34/826; A01D 34/68; A01D 34/6806; A01D 34/6818;
(Continued)

(56) References Cited

U.S. PATENT DOCUMENTS 1,899,564 A 2/1933 Frey
D158,847 S 6/1950 Flanigan
(Continued)

FOREIGN PATENT DOCUMENTS

CN 1299582 A 6/2001
CN 200953749 Y 9/2006
(Continued)

OTHER PUBLICATIONS

One World's Initial Invalidity Contentions, Case No. 19-1293-LPS (49 pages).
(Continued)

*Primary Examiner* — Thomas B Will
*Assistant Examiner* — Joan D Misa
(74) *Attorney, Agent, or Firm* — Greenberg Traurig, LLP

(57) ABSTRACT

A lawncare apparatus includes a main body, multiple wheels supporting the main body, a cutting blade disposed in the main body, a motor driving the cutting blade, and an operating arm connected to the first end of the main body. The distance in the horizontal direction between the axial central line of the cylindrical gripping portion of the operating arm and the axes of the elongated handle of the main body along the length direction is less than 5 cm. Because of the structure mate relationship between the operating arm and the cylindrical gripping portion, the operator feels more comfortable during the transporting process, the volume of lawncare apparatus during transporting is reduced and the convenience of transporting is improved.

14 Claims, 5 Drawing Sheets

Related U.S. Application Data continuation of application No. 14/048,158, filed on Oct. 8, 2013, now Pat. No. 9,888,627.

(51) Int. Cl.
| | |
|---|---|
| *A01D 75/00* | (2006.01) |
| *A01D 69/08* | (2006.01) |
| *A01D 34/00* | (2006.01) |
| *A01D 101/00* | (2006.01) |

(52) U.S. Cl.
CPC ....... *A01D 34/6806* (2013.01); *A01D 34/824* (2013.01); *A01D 69/08* (2013.01); *A01D 75/006* (2013.01); *A01D 2101/00* (2013.01)

(58) Field of Classification Search
CPC .... A01D 34/58; A01D 34/006; A01D 75/006; A01D 2101/00; A01D 2034/6837; A01D 2034/6843
See application file for complete search history.

(56) References Cited

U.S. PATENT DOCUMENTS

| | | | |
|---|---|---|---|
| 2,702,448 A † | 2/1955 | Smith | |
| 2,727,753 A | 12/1955 | Johnson et al. | |
| 2,867,960 A * | 1/1959 | Stiles | A01D 34/78 |
| | | | 56/17.2 |
| 3,038,737 A | 6/1962 | Lill | |
| 3,142,950 A | 8/1964 | West | |
| 3,209,887 A | 10/1965 | Feldstein | |
| 3,230,695 A | 1/1966 | West | |
| 3,253,391 A | 5/1966 | Meldahl | |
| 3,357,716 A | 12/1967 | Musichuk | |
| 3,423,103 A | 1/1969 | Maltarp | |
| 3,462,924 A | 8/1969 | Erickson et al. | |
| 3,485,017 A | 12/1969 | Beares et al. | |
| 3,527,469 A | 9/1970 | Gobin | |
| 3,534,432 A | 10/1970 | Davies et al. | |
| 3,603,065 A | 9/1971 | Weber | |
| 3,659,170 A * | 4/1972 | Burkett | H02K 7/1026 |
| | | | 318/372 |
| 3,702,016 A | 11/1972 | Keesee | |
| 3,750,378 A * | 8/1973 | Thorud | A01D 43/0631 |
| | | | 56/10.5 |
| 3,809,837 A | 5/1974 | Yoshioka | |
| 3,816,873 A | 6/1974 | Thorud et al. | |
| 3,823,291 A | 7/1974 | Milcoy | |
| 3,855,763 A | 12/1974 | Seifert | |
| 3,942,604 A * | 3/1976 | Black, III | B60K 28/00 |
| | | | 180/272 |
| 3,982,082 A | 9/1976 | Thorud et al. | |
| 4,003,190 A * | 1/1977 | Braun | A01D 34/6806 |
| | | | 56/10.5 |
| 4,043,102 A * | 8/1977 | Uhlinger | A01D 43/0631 |
| | | | 56/17.4 |
| 4,044,532 A | 8/1977 | Lessig, III | |
| 4,161,639 A | 7/1979 | Nofel | |
| 4,167,221 A | 9/1979 | Edmonson et al. | |
| 4,181,333 A | 1/1980 | Stelma | |
| 4,221,108 A | 9/1980 | Owens | |
| 3,029,887 A | 4/1982 | Schantz | |
| 4,362,228 A | 12/1982 | Plamper et al. | |
| 4,363,206 A | 12/1982 | Schmitt | |
| 4,394,893 A * | 7/1983 | Kronich | A01D 34/6812 |
| | | | 477/204 |
| 4,413,466 A | 11/1983 | Beugelsdyk et al. | |
| 4,428,180 A | 1/1984 | Carlson | |
| 4,432,191 A | 2/1984 | Schmitt | |
| 4,476,643 A | 10/1984 | Hilchey et al. | |
| 4,503,958 A | 3/1985 | Nishio | |
| 4,573,307 A | 3/1986 | Wick | |
| 4,659,884 A | 4/1987 | Wollenhaupt | |
| 4,753,062 A | 6/1988 | Roelle | |
| 4,833,935 A * | 5/1989 | Roelle | A01D 34/6818 |
| | | | 180/19.3 |
| 4,850,182 A | 7/1989 | Barnard et al. | |
| 4,870,811 A | 10/1989 | Steele | |
| 4,882,897 A | 11/1989 | Oshima et al. | |
| 4,899,446 A † | 2/1990 | Akiba | |
| 4,932,622 A | 6/1990 | Hayakawa | |
| 4,936,160 A | 6/1990 | Barnard et al. | |
| 4,981,011 A * | 1/1991 | Olejak | A01D 43/0631 |
| | | | 56/10.2 R |
| 5,020,308 A | 6/1991 | Braun et al. | |
| 5,138,824 A * | 8/1992 | Oshima | A01D 34/6806 |
| | | | 56/10.2 R |
| 5,163,275 A | 11/1992 | Hare et al. | |
| 5,203,147 A * | 4/1993 | Long | A01D 34/6818 |
| | | | 56/10.1 |
| 5,209,051 A | 5/1993 | Langdon | |
| 5,261,215 A | 11/1993 | Hartz et al. | |
| 5,558,210 A | 9/1996 | Jonischus | |
| 5,606,851 A | 3/1997 | Bruener et al. | |
| 5,636,504 A | 6/1997 | Kaley et al. | |
| 5,784,868 A | 7/1998 | Wadzinski et al. | |
| 5,806,374 A | 9/1998 | Mizutani et al. | |
| 6,006,434 A | 12/1999 | Templeton et al. | |
| 6,078,015 A | 6/2000 | Martinez | |
| 6,082,083 A | 7/2000 | Stalpes et al. | |
| 6,095,294 A | 8/2000 | McGourthy, Sr. et al. | |
| 6,220,005 B1 | 4/2001 | Plamper et al. | |
| 6,293,349 B1 | 9/2001 | Marshall | |
| 6,404,078 B1 * | 6/2002 | Thomas | H01H 9/06 |
| | | | 307/115 |
| 6,644,002 B2 * | 11/2003 | Trefz | A01D 34/6806 |
| | | | 56/10.8 |
| 6,658,829 B2 | 12/2003 | Kobayashi et al. | |
| 6,698,173 B2 | 3/2004 | Joseph | |
| 6,708,473 B2 | 3/2004 | Nicolay et al. | |
| 6,737,598 B1 * | 5/2004 | Allen | H01H 15/102 |
| | | | 200/537 |
| 6,751,936 B2 | 6/2004 | Kucera et al. | |
| 6,796,392 B2 | 9/2004 | Kobayashi et al. | |
| 7,178,322 B2 * | 2/2007 | Osborne | A01D 34/824 |
| | | | 56/10.8 |
| 7,179,200 B1 | 2/2007 | Wu | |
| 7,263,818 B2 | 9/2007 | Osborne | |
| 7,293,397 B2 | 11/2007 | Osborne | |
| 7,543,430 B2 | 6/2009 | Kaskawitz et al. | |
| 7,591,126 B2 * | 9/2009 | Cox | A01D 34/824 |
| | | | 56/10.8 |
| 7,707,812 B2 | 5/2010 | Cheung | |
| 7,712,292 B2 | 5/2010 | Stover et al. | |
| 7,762,049 B2 | 7/2010 | Eaton et al. | |
| 8,098,036 B2 † | 1/2012 | Matsunaga | |
| 8,193,464 B2 | 6/2012 | Ahn | |
| 8,316,510 B2 | 11/2012 | Anraku | |
| 8,359,821 B2 | 1/2013 | Park | |
| 8,713,761 B2 | 5/2014 | Grewe et al. | |
| 8,925,293 B2 | 1/2015 | Mikula et al. | |
| 9,060,463 B2 | 6/2015 | Yamaoka et al. | |
| 9,218,924 B2 | 12/2015 | Coussins et al. | |
| 9,462,747 B2 | 10/2016 | Schmalz | |
| 9,491,907 B2 | 11/2016 | Edholm et al. | |
| 9,596,806 B2 | 3/2017 | Yamaoka et al. | |
| 9,648,805 B2 | 5/2017 | Nie et al. | |
| 9,651,138 B2 | 5/2017 | Helin et al. | |
| 9,826,686 B2 | 11/2017 | Yamaoka et al. | |
| 9,847,186 B2 | 12/2017 | Wadzinski | |
| 9,888,627 B2 | 2/2018 | Yamaoka et al. | |
| 9,986,686 B2 | 6/2018 | Yamaoka et al. | |
| 10,070,588 B2 | 9/2018 | Yamaoka et al. | |
| 10,123,478 B2 | 11/2018 | Shaffer et al. | |
| 10,477,772 B2 | 11/2019 | Yamaoka et al. | |
| 10,485,169 B2 | 11/2019 | Yamaoka et al. | |
| 10,485,176 B2 | 11/2019 | Yamaoka et al. | |
| 10,492,365 B2 | 12/2019 | Yamaoka et al. | |
| 10,524,420 B2 | 1/2020 | Yamaoka et al. | |
| 2006/0075732 A1 * | 4/2006 | Nottingham | A01D 34/416 |
| | | | 56/12.7 |
| 2006/0096135 A1 | 5/2006 | Schaffer et al. | |
| 2009/0217636 A1 * | 9/2009 | Loxterkamp | A01D 34/64 |
| | | | 56/10.8 |

(56) References Cited

U.S. PATENT DOCUMENTS

| | | | |
|---|---|---|---|
| 2009/0293655 A1 | 12/2009 | Tseng et al. | |
| 2010/0162674 A1* | 7/2010 | Eaton | A01D 34/6818 56/10.5 |
| 2011/0088362 A1 | 4/2011 | Rosa et al. | |
| 2011/0126502 A1 | 6/2011 | Pitman et al. | |
| 2011/0302895 A1 | 12/2011 | Park | |
| 2012/0317821 A1* | 12/2012 | Tsuchiya | B25F 5/02 30/196 |
| 2012/0317948 A1 | 12/2012 | Abe et al. | |
| 2013/0111866 A1 | 5/2013 | Schmalz | |
| 2013/0212996 A1 | 8/2013 | Shao et al. | |
| 2014/0102063 A1* | 4/2014 | Yamaoka | A01D 34/828 56/10.5 |
| 2014/0190141 A1* | 7/2014 | Edholm | A01D 34/824 56/10.5 |
| 2014/0196425 A1 | 7/2014 | Lewis | |
| 2014/0331809 A1* | 11/2014 | Mikula | A01D 34/824 74/491 |
| 2018/0228089 A1 | 8/2018 | Yamaoka et al. | |

FOREIGN PATENT DOCUMENTS

| | | |
|---|---|---|
| CN | 201146132 Y | 11/2008 |
| CN | 101516178 A | 8/2009 |
| CN | 201345826 Y | 11/2009 |
| CN | 101897261 A | 12/2010 |
| CN | 201821663 | 5/2011 |
| CN | 201821663 U | 5/2011 |
| CN | 202019551 U | 11/2011 |
| CN | 102523817 A | 7/2012 |
| CN | 102683052 A | 9/2012 |
| CN | 202455826 U | 10/2012 |
| CN | 102845186 A | 1/2013 |
| CN | 202873363 U | 4/2013 |
| DE | 3827926 A1 | 2/1990 |
| DE | 102004020985 A1 | 11/2005 |
| EP | 0047416 A1 | 3/1982 |
| EP | 0822346 A1 | 4/1998 |
| EP | 0903074 A1 | 3/1999 |
| EP | 1543711 † | 6/2005 |
| EP | 1543711 A2 | 6/2005 |
| EP | 24245700 A2 | 3/2012 |
| EP | 2622953 A1 | 8/2013 |
| EP | 3381259 | 10/2018 |
| FR | 2768300 A1 | 3/1999 |
| FR | 2780375 A1 | 12/1999 |
| GB | 2386813 † | 1/2003 |
| GB | 2386813 A | 10/2003 |
| JP | H0530835 A | 2/1993 |
| JP | H0584102 U | 11/1993 |
| JP | H05284834 A | 11/1993 |
| JP | 2003130017 A | 5/2003 |
| JP | 2009034000 A | 2/2009 |
| JP | 2009268437 A | 11/2009 |
| JP | 2011072211 A | 4/2011 |
| JP | 2013063052 A | 4/2013 |
| JP | 2013066401 A | 4/2013 |
| JP | 2013153753 A | 8/2013 |
| JP | 2013165676 A | 8/2013 |
| JP | 2013247888 A | 12/2013 |
| WO | 2008026550 A1 | 3/2008 |
| WO | 20120115543 A1 | 8/2012 |
| WO | 20130122266 A2 | 8/2013 |

OTHER PUBLICATIONS

One World's Initial Invalidity Contentions Exhibits A-1-A-2 463 Chart, Case No. 19-1923-LPS (19 pages).
One World's Initial Invalidity Contentions Exhibits B-1-B-6 806 Chart, Case No. 19-1923-LPS (72 pages).
One World's Initial Invalidity Contentions Exhibits C-1-C-2 686 Chart, Case No. 19-1923-LPS (37 pages).
One World's Initial Invalidity Contentions Exhibit D-1 686 Chart, Case No. 19-1923-LPS (35 pages).
One World's Initial Invalidity Contentions Exhibits E-1-E-4 588 Chart, Case No. 19-1923-LPS (124 pages).
One World's Initial Invalidity Contentions Exhibits F-1-F-2 805 Chart, Case No. 19-1923-LPS (37 pages).
One World's Initial Invalidity Contentions Exhibits G-1-G-3 772 Chart, Case No. 19-1923-LPS (69 pages).
One World's Initial Invalidity Contentions Exhibits H-1-H-2 176 Chart, Case No. 19-1923-LPS (78 pages).
One World's Initial Invalidity Contentions Exhibit I-1 420 Chart, Case No. 19-1923-LPS (19 pages).
ANSI B.71.1-2012.
Black and Decker CM2040 electric lawn mower (56 pages) undated.
Cub Cadet CC 500 BAT electric lawn mower (50 pages) undated.
Earthwise CST00012 electric string trimmer (12 pages) undated.
Greenworks 21052 electric string trimmer (29 pages) undated.
Greenworks 21212 electric string trimmer (26 pages) undated.
Homelite UT41110 electric trimmer (16 pages) undated.
Neuton CE6 electric lawn mower (74 pages) undated.
Recharge Ultralite PML1-14 electric lawn mower (25 pages) undated.
Ryobi RY14110 electric lawn mower (63 pages) undated.
Ryobi RY40100 electric lawn mower (80 pages) undated.
Sun Joe SB600E electric trimmer (15 pages) undated.
Toro e-Cycler 20360 electic lawn mower (12 pages) undated.
Worx WG789 electric lawn mower (58 pages) undated.
Case IPR2020-0083—U.S. Pat. No. 9,060,463—Petition for Inter Partes Review filed May 1, 2020.
Case IPR2020-00884—U.S. Pat. No. 9,596,806—Petition for Inter Partes Review filed May 1, 2020.
Case IPR2020-0085—U.S. Pat. No. 9,648,805—Petition for Inter Partes Review filed May 1, 2020.
Case IPR2020-0086—U.S. Pat. No. 9,826,686—Petition for Inter Partes Review filed May 1, 2020.
Case IPR2020-00887—U.S. Pat. No. 9,986,686—Petition for Inter Partes Review filed May 1, 2020.
Case IPR2020-00888—U.S. Pat. No. 10,070,588—Petition for Inter Partes Review filed May 1, 2020.
Case PGR2020-00059—Petition for Post-Grant Review of U.S. Pat. No. 10,477,772 filed May 1, 2020.
Case PGR2020-00060—Petition for Post-Grant Review of U.S. Pat. No. 10,485,176 filed May 1, 2020.
Case PGR2020-00061—Petition for Post-Grant Review of U.S. Pat. No. 10,524,420 filed May 1, 2020.
16 CFR part 1205 (2012).
ANSI/OPEI B71.1-2012; "American National Standard for Consumer Turf Care Equipment—Pedestrian-Controlled Mowers and Ride-On Mowers.—Safety Specifications".
American National Standards Institute, Inc.; Apr. 23, 2012, 118 pages.
Canadian Intellectual Property Office, Office Action and Examination Search Report issued on CA Appl. No. 2,829,898, dated Jan. 27, 2015, 4 pgs.
United States Patent and Trademark Office, Office Action issued on U.S. Appl. No. 14/048,158, Notification dated May 1, 2017, 29 pgs.
United States Patent and Trademark Office, Non-Final Office Action issued on U.S. Appl. No. 15/250,476, Notification dated Oct. 13, 2017, 17 pgs.
United States Patent and Trademark Office, Non-Final Office Action issued on U.S. Appl. No. 15/250,516, Notification dated Oct. 13, 2017, 16 pgs.
United States Patent and Trademark Office, Final Office Action issued on U.S. Appl. No. 15/250,476, dated Mar. 1, 2018, 11 pgs.
United States Patent and Trademark Office, Office Action issued on U.S. Appl. No. 15/238,276, Notification dated Feb. 26, 2019, 9 pgs.
United States Patent and Trademark Office, Non-Final Office Action issued on U.S. Appl. No. 15/373,840, Notification dated Apr. 19, 2019, 14 pgs.
United States Patent and Trademark Office, Non-Final Office Action issued on U.S. Appl. No. 15/373,798, Notification dated Apr. 29, 2019, 21 pgs.
United States Patent and Trademark Office, Non-Final Office Action issued on U.S. Appl. No. 15/910,282, Notification dated Jul. 30, 2019, 6 pgs.

(56) References Cited

OTHER PUBLICATIONS

United States Patent and Trademark Office, Office Action issued on U.S. Appl. No. 16/406,337, Notification dated Jul. 30, 2019, 8 pgs.
United States Patent and Trademark Office, Final Office Action issued on U.S. Appl. No. 15/238,276, Notification dated Aug. 2, 2019, 7 pgs.
Decision dated Nov. 6, 2020 for IPR2020-00883, 24 pages.
Decision dated Nov. 6, 2020 for IPR2020-00884, 62 pages.
Decision dated Nov. 6, 2020 for IPR2020-00885, 43 pages.
Decision dated Nov. 6, 2020 for IPR2020-00886, 62 pages.
Decision dated Nov. 6, 2020 for IPR2020-00887, 55 pages.
Decision dated Nov. 6, 2020 for IPR2020-00888, 74 pages.
Decision dated Dec. 7, 2020 for PGR2020-00059, 48 pages.
Decision dated Dec. 7, 2020 for PGR2020-00060, 57 pages.
Decision dated Dec. 7, 2020 for PGR2020-00061, 19 pages.
U.S. Patent and Trademark Office, Non-Final Office Action issued in U.S. Appl. No. 17/209,722, dated Jun. 25, 2021, 12 pgs.
ANSI/OPEI B71.1.-2012; "American National Standard for Consumer Turf Care Equipment—Pedestrian-Controlled Mowers and Ride-On Mowers—Safety Specifications"; American National Standards Institute, Inc.: Apr. 23, 2012, 118 pages.†

\* cited by examiner
† cited by third party

SAFETY ASSEMBLY FOR A LAWNCARE APPARATUS

RELATED APPLICATION INFORMATION

This application claims the benefit of and is a continuation of U.S. application Ser. No. 15/238,276, filed Aug. 16, 2016, now U.S. Pat. No. 10,524,420, which is a continuation of U.S. application Ser. No. 14/048,158, filed Oct. 8, 2013, now U.S. Pat. No. 9,888,627, which application claims the benefit of CN 201210387914.9, filed on Oct. 15, 2012, and CN 201220602040.X, filed on May 3, 2013, the disclosures of which are each incorporated herein by reference in their entirety.

FIELD OF THE DISCLOSURE

The subject disclosure relates to garden tools and, more particularly, to a lawncare apparatus.

BACKGROUND

A commonly used lawncare apparatus, such as a walk-behind lawnmower, includes a cutting device, a deck supporting the cutting device, a chassis having four wheels to which the deck is mounted, and a handle for pushing a main body of the lawncare apparatus disposed at one end of the chassis.

When using the lawnmower, there are two ways to transport the lawnmower from a storage room to a lawn. The first way is to place the four wheels on the ground and push/pull the lawnmower. The second way is to lift the lawnmower away from the ground. The first way requires a large storage room and the second way requires that the lawnmower is of light weight. That is, the way to transport the lawnmower from the storage room to the lawn needs to be improved.

SUMMARY

The following will describe an apparatus which can improve operating comfort of the operator, reduce volume of the apparatus during transporting and/or storage, and further improve convenience of transporting.

To achieve the above object, a described apparatus includes a main body, a plurality of wheels supporting the main body, an accessory disposed in the main body, a motor driving the cutting blade, and an operating arm connected to the first end of the main body, wherein an elongated handle is disposed on the second end of the main body which is away from the operating arm. The operating arm includes a cylindrical gripping portion and the operating arm can be folded to a folded position. When the operating arm is at the folded position and the multiple wheels contacts the level surface, the distance in the horizontal direction between the axial central line of the cylindrical gripping portion and the axes of the elongated handle along the length direction is less than 5 cm.

To achieve the above object, another described apparatus includes a main body, a plurality of wheels supporting the main body, an accessory disposed in the main body, a motor driving the cutting blade, an operating arm connected to a first end of the main body, and an elongated handle positioned on a second end of the main body which is away from the operating arm. The operating arm is capable of being folded to a folded position and the internal profile of the operating arm is mated with the external profile of the elongated handle such that the operating arm at the folded position is clearance fitted with the elongated handle.

The apparatus of the invention can be pulled obliquely. Further, because of the structure mate relationship between the operating arm and the cylindrical gripping portion, the operator will feel more comfortable during the transporting process and the volume of the apparatus during transporting is reduced, and further, the convenience of transporting is improved.

DETAILED DESCRIPTION

The invention will be described below in details with reference to the drawings and preferred embodiments thereof.

Figure 1:
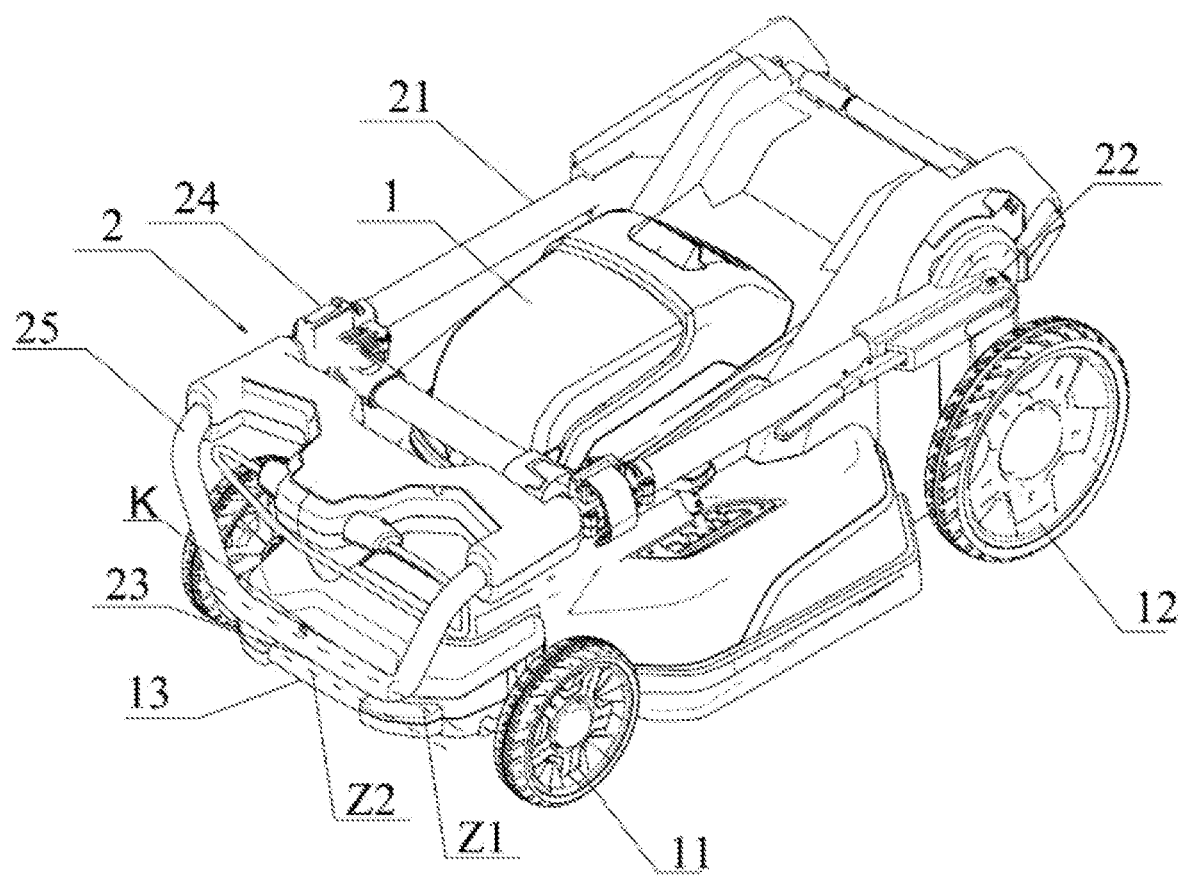
FIG. 1 is a schematic, isometric view showing an exemplary lawncare apparatus constructed according to the description which follows wherein an operating arm is folded.
Figure 2:
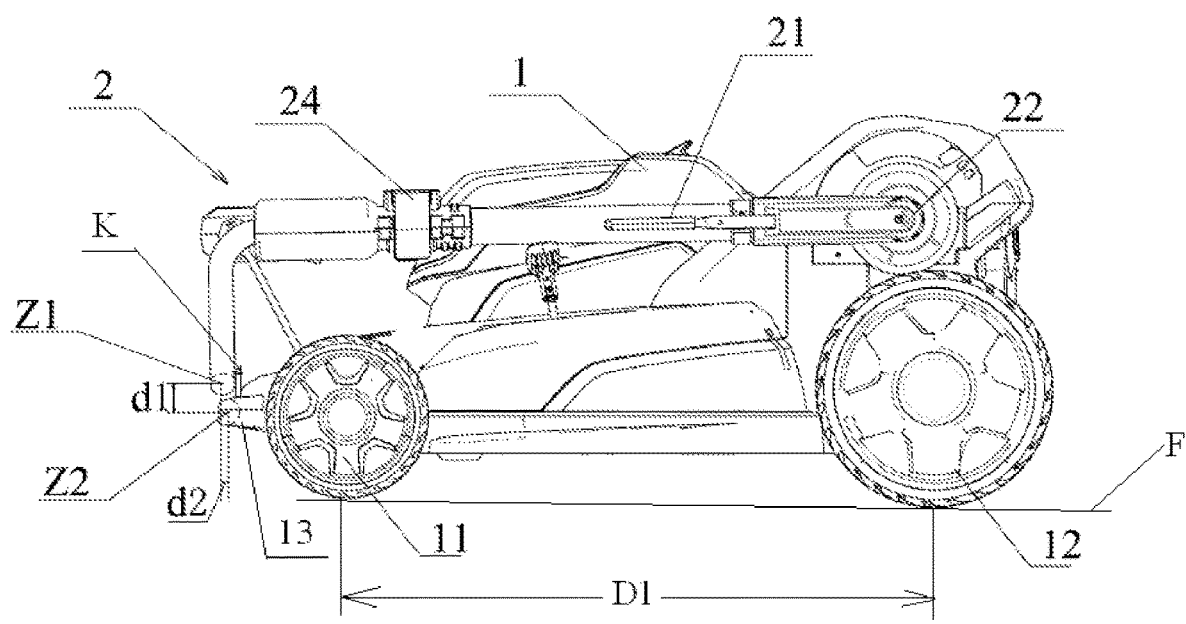
FIG. 2 is a side schematic view showing the exemplary lawncare apparatus of FIG. 1.

Referring to FIG. 1 and FIG. 2, in the illustrated embodiment, the lawncare apparatus is a hand push lawnmower. The lawncare apparatus includes a main body 1, a first pair of wheels 11 and a second pair of wheels 12 supporting the main body 1, a cutting blade disposed in the main body 1, a motor driving the cutting blade, and an operating arm 2 connected to the first end (rear end) of the main body 1. The first pair of wheels 11 and the second pair of wheels 12 are disposed respectively at the second end (front end) and the first end (rear end) of the main body 1. The operating arm 2 is pivotally connected to the rear end of the main body 1 by a pivot shaft 22 and positioned above the second pair of wheels 12. The front end of the main body 1, which is away from the operating arm 2, includes an elongated handle 13. In the illustrated embodiment the elongated handle 13 is substantially cylinder-shaped and includes an axis Z2 along the longitude direction. The operating arm 2 includes a cylindrical gripping portion 23 and can be folded to a folded position, and the cylindrical gripping portion 23 includes an axial central line Z1.

When the operating arm is at the folded position and the first pair of wheels 11 and the second pair of wheels 12 both contact the horizontal surface F, if the gripping portion 23 is above the handle 13, the distance d1 in the vertical direction between the axial central line Z1 and the axis Z2 along the longitude direction is greater than the sum of the radius of the gripping portion 23 and the radius of the cylinder-shaped handle 13, and the distance d1 is less than 5 cm. For example, the diameters of the gripping portion 23 and the cylinder-shaped handle 13 are both 1.5 cm, then the distance d1 is at least greater than 1.5 cm. Preferably, the distance d1 is 3 cm, and a distance d2 in the horizontal direction between the axial central line Z1 and the axis Z2 is also less than 5 cm, and in the illustrated embodiment, the distance d2 is preferably 0.5 cm. Therefore, when the operating arm 2 is at the folded position, the user can grip both the gripping portion 23 and the cylinder-shaped handle 13 conveniently.

Additionally, in an alternative embodiment, to allow the user to grip both the gripping portion 23 and the cylinder-shaped handle 13 more conveniently, the internal profile of the gripping portion 23 is mated with the external profile of the cylinder-shaped handle 13, such that when the operation arm 2 is at the folded position, the outer surface of the gripping portion 23 and the cylinder-shaped handle 13 contact with each other. At this time, the gripping portion 23 and the cylinder-shaped handle 13 can lie in a horizontal plane, the distance d2 in the horizontal direction between the axial central line Z1 and the axis Z2 is larger than the sum of the radius of the gripping portion 23 and the radius of the cylinder-shaped handle 13, and the distance d1 is zero. It should be noted that the external profile of the gripping portion 23 may be designed to mate with the internal profile of the cylinder-shaped handle 13.

To allow the user to grip both the gripping portion 23 and the cylinder-shaped handle 13 more stably, a clip K is disposed on the handle 13. When the operation arm is at the folded position, the clip K is engaged with the cylindrical gripping portion 23.

Further, in the illustrated embodiment, the operating arm 2 is extendable, and a safety switch assembly 240 is disposed in the operating arm 2, the operating arm 2 includes an inner pipe 25 and an outer pipe 21, the outer pipe 21 is rotatably connected to the rear end of the main body 1 by the pivot shaft 22, and the end of the outer pipe 21 includes a pipe sleeve 24.

Figure 3:
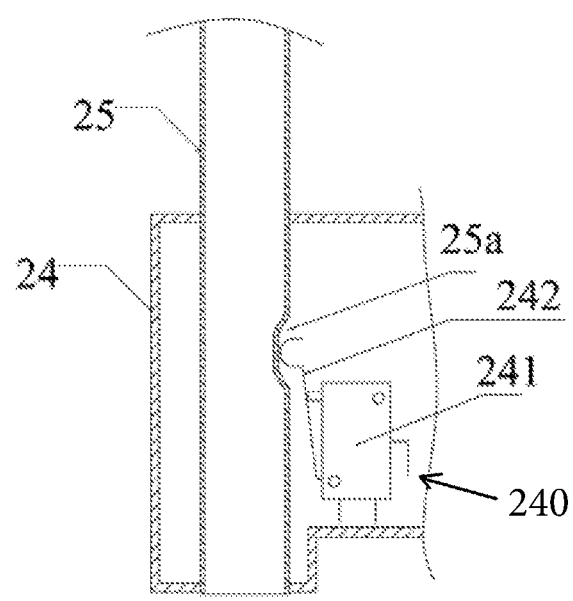
FIG. 3 is a schematic view showing an exemplary safety switch assembly of the lawncare apparatus of FIG. 1.

Referring to FIG. 3, the safety switch assembly 240 is disposed in the sleeve pipe 24 and a safety shift structure 25a is disposed in the inner pipe 25. The safety switch assembly 240 includes a safety switch 241 and a trigger assembly 242 configured to trigger the safety switch 241 when the safety shift structure 25a of the inner pipe 25 is disengaged from a safety location and reset the safety switch 241 when the safety shift structure 25a returns to the safety location. The safety switch 241 is electrically connected to a control circuit for controlling the motor in the main body 1.

In the embodiment, the trigger assembly 242 is a contacting spring sheet. One end of the trigger assembly 242 is connected to the safety switch 241 and the other end is a free end. When the inner pipe 25 slides, the wall of the inner pipe 25 presses the trigger assembly 242 to trigger the safety switch 241. The trigger assembly 242 is formed with elasticity. When the inner pipe 25 slides, the safety shift structure 25a moves back to the safe position and, at this time, the safety shift structure 25a is within a receiving groove configured to accommodate the trigger assembly 242, and the trigger assembly 242 is out of outer force and will not trigger the safety switch 241.

When the inner pipe 25 is retracted into the outer pipe 21, the safety shift structure 25a leaves the safe position and the wall of the inner pipe 25 presses the trigger assembly 242 to trigger the safety switch. At this time, even during the transporting process, if the user operates the operating switch by mistake, the motor cannot be started, which can reduce the possibility of danger happening to the user.

Figure 4:
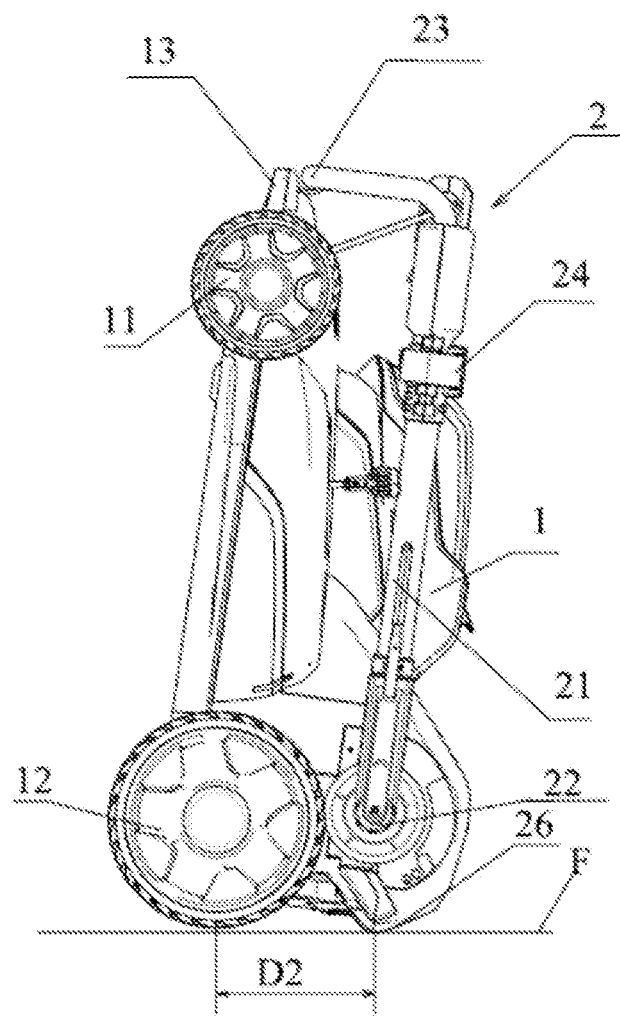
FIG. 4 is a side schematic view showing the lawncare apparatus of FIG. 1 in a storage position.

Additionally, referring to FIG. 2 again, when the lawnmower is at the using position, the first pair wheels 11 and the second pair wheels 12 are supported on the supporting surface F. If light is shining from a direction perpendicular to the supporting surface F, the main body 1 of the lawnmower projects a first orthographic projection on the supporting surface F. Referring to FIG. 4, the lawnmower is at the storage position. When the lawnmower is stored, the lawnmower stands uprightly for storing in a storage room and the operating arm 2 is folded and only the second wheels 2 are supported on the supporting surface F. For improving stability, a supporting portion 26 is disposed on the main body 1 for supporting on the supporting surface F, and the supporting portion can be integrated with or separated from the main body 1. In the same way, at this time if light is shining from a direction perpendicular to the supporting surface F, the main body 1 of the lawnmower projects a second orthographic projection on the supporting surface F. Since the width of the lawnmower at the using position is the same as that of the lawnmower at the storage position, and the distance D1 between the first pair wheels 11 and the second pair wheels 12 is larger than the distance D2 between the first pair of wheels 11 and the supporting portion 26, the first orthographic projection area of the lawnmower at the using position is larger than the second orthographic projection area of the lawnmower at the storage position.

Figure 5:
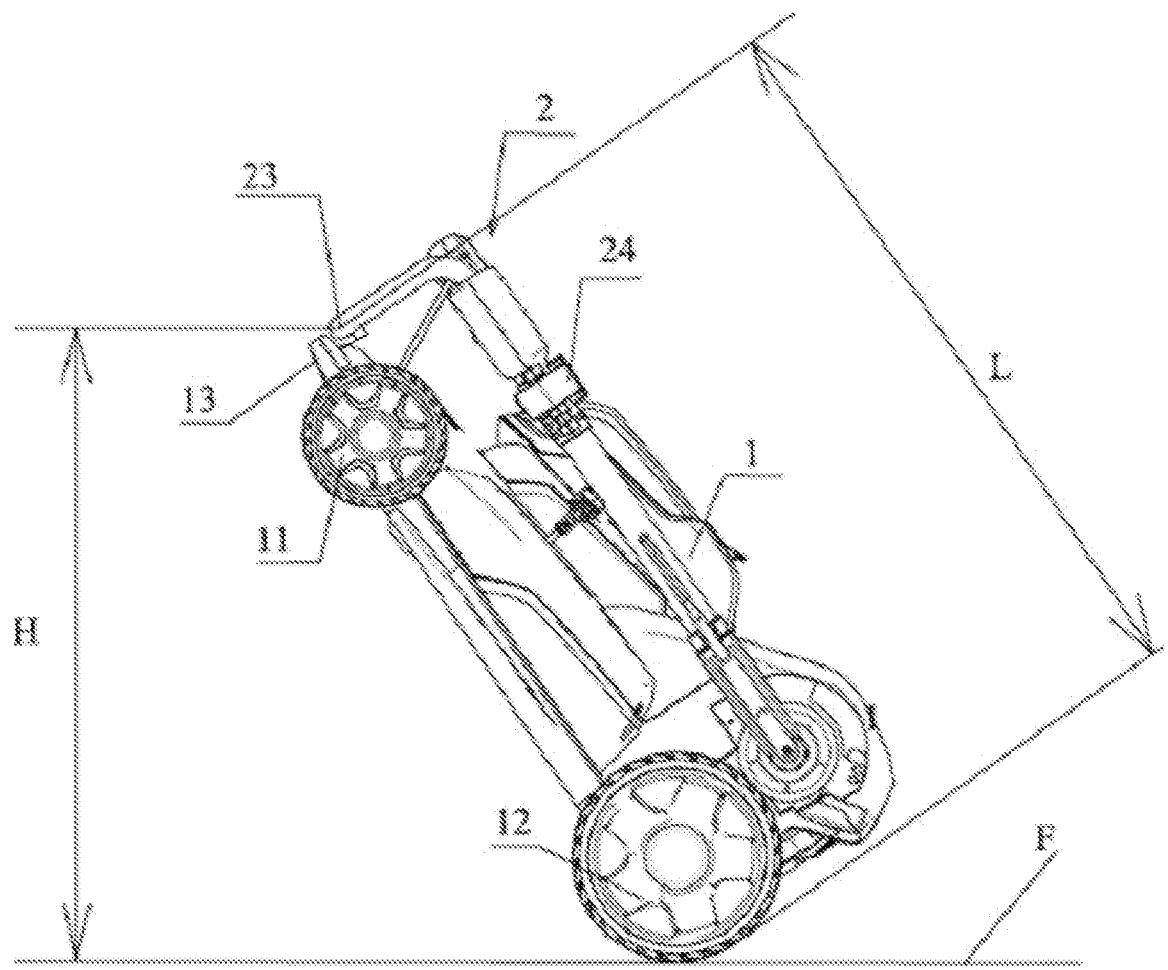
FIG. 5 is a side schematic view showing the lawncare apparatus of FIG. 1 in an obliquely disposed, pulling position.

Referring to FIG. 5, when the lawnmower is changed from the using position to the obliquely pulled position, only the second pair wheels 12 contact the supporting surface and the hands of the user grip a pull portion which is preferably the cylindrical gripping portion 23. At this time, the operating arm 2 is at the folded position, the distance of the gripping portion 23 relative to the supporting surface F is H; the distance of the gripping portion 23 relative to the point the second pair wheels 12 contacting the supporting surface F is L, and the ratio of H to L may be 0.5~1, preferably 0.8~0.9, for meeting the needs of ergonomics. Therefore, when pulling the lawnmower, only part of the weight of the lawnmower is supported by the user, which makes the user feel more labor-saving.

From the above, the described lawncare apparatus can be pulled obliquely, and because of the structure mate relationship between the operating arm and the cylindrical gripping portion, the user can feel more comfortable during transporting and the pulling process is more stable, so that the volume of the lawncare apparatus during transporting is reduced and the operability of lawnmower pulling is improved. Since a safety switch mechanism is disposed on the operating arm, misoperation of the lawncare apparatus can be avoided and safety of pulling is improved.

The general principle, primary features and advantages of the invention have been illustrated and described above. Those skilled in the art will appreciate that the foregoing embodiments are not intended to limit the invention in any form and technical implementations derived with equal substitutions or equivalent variations shall be considered as falling within the scope of the claimed invention.

We claim:
1. An apparatus, comprising:
a main body;
a plurality of wheels supporting the main body;
a functional accessory coupled to the main body;
a motor supported by the main body and drivingly coupled to the functional accessory;
a control circuit electrically coupled to the motor for controlling operation of the motor;
an operating arm connected to the main body, the operating arm comprising a first member and a second member telescopically coupled with the first member, wherein the first member will slidably move relative to the second member and in a direction towards the main body in response to the operating arm being subjected to a first force that is in the direction that is towards the main body; and a safety assembly operably coupled to the operating arm to detect relative movement between the first member and the second member and comprising a switch coupled to the control circuit for triggering the control circuit to cause the control circuit to disable operation of the motor when the first member is slidably moved towards the main body from a predetermined position relative to the second member and to reset the switch for triggering the control circuit to cause the control circuit to enable operation of the motor when the first member is slidably moved away from the main body to the predetermined position relative to the second member.

2. The apparatus as recited in claim 1, wherein the safety assembly comprises a moveable element that is biased towards the first member and wherein the moveable element provides a second force upon the first member to inhibit the first member from being slidably moved towards the main body from the predetermined position relative to the second member.

3. The apparatus as recited in claim 2, wherein the moveable element is rotatably moveable.

4. The apparatus as recited in claim 2, wherein the moveable element comprises a rounded end that engages with the first member.

5. The apparatus as recited in claim 1, wherein the safety assembly is mounted to the second member.

6. The apparatus as recited in claim 1, wherein the first member has a first surface portion and a second surface portion, wherein the second surface portion is radially closer to a longitudinal axis of the first member than the first surface portion, and wherein the first surface portion defines the predetermined position relative to the second member.

7. The apparatus as recited in claim 6, wherein the first member has an angled surface that provides a transition from the second surface portion to the first surface portion.

8. The apparatus as recited in claim 1, wherein the safety assembly continues to cause the control circuit to disable operation of the motor when the first member is moved from the predetermined position relative to the second member in a direction that is towards the main body.

9. The apparatus as recited in claim 1, wherein the safety assembly is electrically connected to the control circuit.

10. The apparatus as recited in claim 1, wherein the first member comprises a pipe.

11. The apparatus as recited in claim 10, wherein the second member comprises a pipe.

12. The apparatus as recited in claim 11, wherein the first member is disposed at least partially within the second member.

13. The apparatus as recited in claim 1, wherein the second member is rotatably attached to the main body.

14. The apparatus as recited in claim 1, wherein the functional accessory is a cutting blade.

* * * * *